May 27, 1930.  H. HASTING  1,760,551
TWIN BODY TIRE VALVE
Filed Jan. 25, 1929
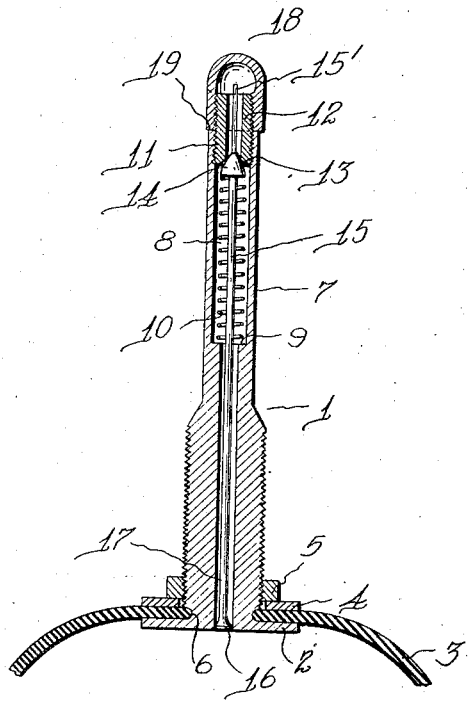
INVENTOR
*Homer Hasting*
BY
ATTORNEYS

Patented May 27, 1930

1,760,551

UNITED STATES PATENT OFFICE

HOMER HASTING, OF DETROIT, MICHIGAN

TWIN-BODY TIRE VALVE

Application filed January 25, 1929. Serial No. 334,918.

The present invention pertains to a novel pneumatic tire valve and has as a primary object to attain the highest possible degree of efficiency and simplicity in tire valve constructions. The inflation of the tire is, by use of the present valve, made simple, easy and requiring a minimum amount of energy and the pressure is effectively sealed in the tire when the required pressure is once attained.

A secondary object of the present invention is to construct a twin body tire valve requiring a reduced number of operations necessary in construction over the conventional devices on the market at present. The device is constructed with a dual valve arrangement, separately seating and thereby doubly insures against any leakage of pressure.

With these objects in view and others which are resultant therefrom or subsidiary thereto my invention is fully disclosed by way of example in the following description, reference being made to the accompanying drawing, in which the valve is illustrated in cross section, by use of like characters which are employed to designate the corresponding parts throughout.

The stem of the valve is a hollow tube 1 having at its lower end a flange 2 engaging the inner surface of an inner tube 3. A washer 4 is placed over the stem and a nut 5 is screwed towards the tube whereby the inner tube is clamped between the washer 4 and the flange 2, the edge of the inner tube projecting into a recess 6 formed on the valve stem. The upper end of the valve stem is provided with an extending neck portion 7 which is smaller in diameter than the threaded portion of the stem, the neck portion being adapted to project above the rim or felloe of an automobile wheel.

The neck portion 7 is provided with an enlarged bore 8 which forms a shoulder 9, providing a seat for the compression spring 10. Into the upper end of the bore 8, which is tapped as at 11, is screwed a sleeve 12 having a screwthreaded portion adapted to project above the top of the neck 7. The lower end of the sleeve 12 is formed with a valve seat 13 adapted to be engaged by a valve head 14 carried on a pin 15. The pin has a portion 15' extending upwardly beyond the sleeve 12, serving as a finger piece, and a portion extending downwardly, the lowermost extremity being provided with a valve head 16. The valve head 14 is forced into engagement with the seat 13 by pressure of the spring 10 while at the same time the valve 16 slides longitudinally into the lower end of a smaller bore 17.

A cap 18 is screwed upon the upper projecting end of the sleeve 12 and adapted to be screwed tightly against the upper end of the neck 8 and thereby provide an air tight joint as at 19 and positively seal the air in the tire.

In operation the upwardly projecting pin is forced downwardly which unseats the valve 14 from the seat 13 and causes the valve head 16 to move longitudinally and to extend beyond the flange 2 to permit the air to flow freely through the valve stem. The moment downward pressure is relieved the spring 10 will seat the valve 14 against the seat 13 and cause the valve head 16 to slide into the bore 17 to prevent passing of air through the valve stem. The valves 14 and 16 may both be unseated by air pressure from an air line connected to the upper end of the sleeve 12 when the cap 18 is removed to admit air to the tire but pressure from the inside tends to assist the spring 10 in more securely seating the valve 14. The valve head 16 is such that it blocks passage of air through the bore 17 at any time when the former is in the bore.

Although a specific embodiment of my invention has been illustrated and described it is to be understood that various alterations may be made in the details of construction without departing from the spirit of the invention as defined by the scope of the appended claim.

What I claim is:—

A valve comprising a stem having a circular bore, a valve seat in the upper end of said bore, a pin extending through said bore, a poppet valve formed upon the upper end of said pin and adapted to seat upon said valve seat, a piston formed on the lower end of said stem and adapted to slide into said bore when said poppet valve is in contact with said seat, and a spring adapted to maintain said poppet valve against said seat.

In testimony whereof I affix my signature.

HOMER HASTING.